United States Patent [19]
Yamada et al.

[11] Patent Number: 5,831,688
[45] Date of Patent: *Nov. 3, 1998

[54] IMAGE CODED DATA RE-ENCODING APPARATUS

[75] Inventors: Yoshihisa Yamada; Tokumichi Murakami, both of Kanagawa, Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 461,732

[22] Filed: Jun. 5, 1995

[30] Foreign Application Priority Data

Oct. 31, 1994 [JP] Japan .................................. 6-266882

[51] Int. Cl.$^6$ .............................. H04N 5/14; H04N 9/64; H04N 7/12; H04N 11/02
[52] U.S. Cl. .......................... 348/699; 348/402; 348/405
[58] Field of Search ..................................... 348/416, 418, 348/403, 404, 405, 699, 402, 415, 384, 400; 382/232–233

[56] References Cited

U.S. PATENT DOCUMENTS

| 4,387,460 | 6/1983 | Boutmy et al. . |
| 4,398,217 | 8/1983 | Peters . |
| 4,438,452 | 3/1984 | Powers . |

(List continued on next page.)

FOREIGN PATENT DOCUMENTS

| 0618734 | 10/1994 | European Pat. Off. . |
| 0627858 | 12/1994 | European Pat. Off. . |
| 0637983 | 2/1995 | European Pat. Off. . |
| 2-179186 | 10/1988 | Japan . |
| 6-70178 | 10/1992 | Japan . |
| WO94/23536 | 10/1994 | WIPO . |
| WO95/17795 | 6/1995 | WIPO . |

OTHER PUBLICATIONS

The Constraints on Variable Bit–Rate Video for ATM Networks, Haskell et al., pp. 361–372., Dec. 1992.
Institute of Electrical & Electronics Engineers, 1994 IEEE International Symposium on Circuits and Systems, "Error Accumulation of Repetitive Image Coding".
G. Reitmeier, et al "The Digital Hierarchy—A blueprint for Television in the 21st Century", SMPTE Jul. 1992 pp. 466–470.
"Draft Revision of Recommendation H.261: Video Codec for Audiovisual Services at px64kbit/s" Signal Processing: Image Communication 2(1990).
David, et al "A Third Generation Algorithm for use in High Definition Frame Rate Convertors" Television Symposium and Technical Exhibition, Montreux, Switzerland Jun. 1993.
Richards, et al "A Motion Compensated Standards Converter for Down Conversion . . . " Broadcast Jun. 1992.

*Primary Examiner*—Douglas W. Olms
*Assistant Examiner*—David R. Vincent
*Attorney, Agent, or Firm*—Wolf, Greenfield & Sacks, P.C.

[57] ABSTRACT

A image coded data re-encoding apparatus for regenerated image coded data for transmission or storing by re-encoding decoded image data according to the present invention comprises an image decoder for decoding image coded data, an object for re-encoding, and an image coder for re-encoding the decoded image data, and corresponds to the configuration of international standardizing system MPEG1. The quantizer executes quantization using decoded parameters for quantization from the variable length decoder and transform coefficient inverse quantized by the inverse quantizer. The variable length coder outputs image coded data not decoded by the variable length decoder as it is. The motion compensation predictor predicts motion compensation using motion vectors decoded by the variable length decoder.

43 Claims, 8 Drawing Sheets

U.S. PATENT DOCUMENTS

| | | |
|---|---|---|
| 4,463,377 | 7/1984 | Meyer-Ebrecht et al. . |
| 4,490,712 | 12/1984 | Gourdon et al. . |
| 4,660,079 | 4/1987 | Devimeux et al. . |
| 4,704,628 | 11/1987 | Chen et al. . |
| 4,709,232 | 11/1987 | Leger . |
| 4,769,702 | 9/1988 | Lievre . |
| 4,776,030 | 10/1988 | Tzou . |
| 4,807,053 | 2/1989 | Heijnemans . |
| 4,816,914 | 3/1989 | Ericsson . |
| 4,821,119 | 4/1989 | Gharavi . |
| 4,831,440 | 5/1989 | Borgers et al. . |
| 4,849,812 | 7/1989 | Borgers et al. . |
| 4,862,263 | 8/1989 | Strobach et al. . |
| 4,903,128 | 2/1990 | Thoreau . |
| 5,001,559 | 3/1991 | Gonzales et al. . |
| 5,008,747 | 4/1991 | Carr et al. . |
| 5,010,402 | 4/1991 | Nishino . |
| 5,036,391 | 7/1991 | Auvray et al. ............ 358/133 |
| 5,057,918 | 10/1991 | Denoyelle et al. ......... 358/135 |
| 5,073,821 | 12/1991 | Juri . |
| 5,079,621 | 1/1992 | Daly et al. . |
| 5,107,348 | 4/1992 | Citta et al. . |
| 5,121,216 | 6/1992 | Chen et al. . |
| 5,126,962 | 6/1992 | Chiang . |
| 5,138,315 | 8/1992 | LeQueau et al. . |
| 5,150,432 | 9/1992 | Ueno et al. . |
| 5,159,447 | 10/1992 | Haskell ..................... 358/133 |
| 5,161,015 | 11/1992 | Citta et al. . |
| 5,185,663 | 2/1993 | Hackett . |
| 5,226,085 | 7/1993 | DiFrancesco . |
| 5,228,028 | 7/1993 | Cucchi et al. ............ 370/94.1 |
| 5,241,395 | 8/1993 | Chen . |
| 5,253,078 | 10/1993 | Balkanski et al. . |
| 5,270,832 | 12/1993 | Balkanski et al. . |
| 5,287,182 | 2/1994 | Haskell et al. ............ 348/500 |
| 5,313,298 | 5/1994 | Meeker . |
| 5,327,187 | 7/1994 | Slavitter . |
| 5,329,279 | 7/1994 | Barbu et al. . |
| 5,329,537 | 7/1994 | Alard et al. . |
| 5,349,383 | 9/1994 | Parke et al. . |
| 5,355,167 | 10/1994 | Juri . |
| 5,369,437 | 11/1994 | Koga et al. . |
| 5,381,181 | 1/1995 | Deiss ........................ 348/423 |
| 5,408,270 | 4/1995 | Lim .......................... 348/429 |
| 5,412,431 | 5/1995 | Vogel ....................... 348/405 |
| 5,526,052 | 6/1996 | Ar ............................ 348/405 |
| 5,542,008 | 7/1996 | Sugahara et al. ......... 382/248 |
| 5,544,266 | 8/1996 | Koppelmans et al. .... 382/238 |
| 5,570,199 | 10/1996 | Tanaka et al. ............. 386/95 |

FIG.3B (PRIOR ART)
IMAGE STORING/COPYING SYSTEM USING VCR

I : INTRA CODED PICTURE

P : PREDICTIVE-CODED PICTURE

B : BIDIRECTIONALLY PREDICTIVE-CODED PICTURE

IMAGE CODED DATA RE-ENCODING APPARATUS

FIELD OF THE INVENTION

The present invention relates to an image coded data re-encoding apparatus for decoding and re-encoding image coded data.

BACKGROUND OF THE INVENTION

Figure 3A:
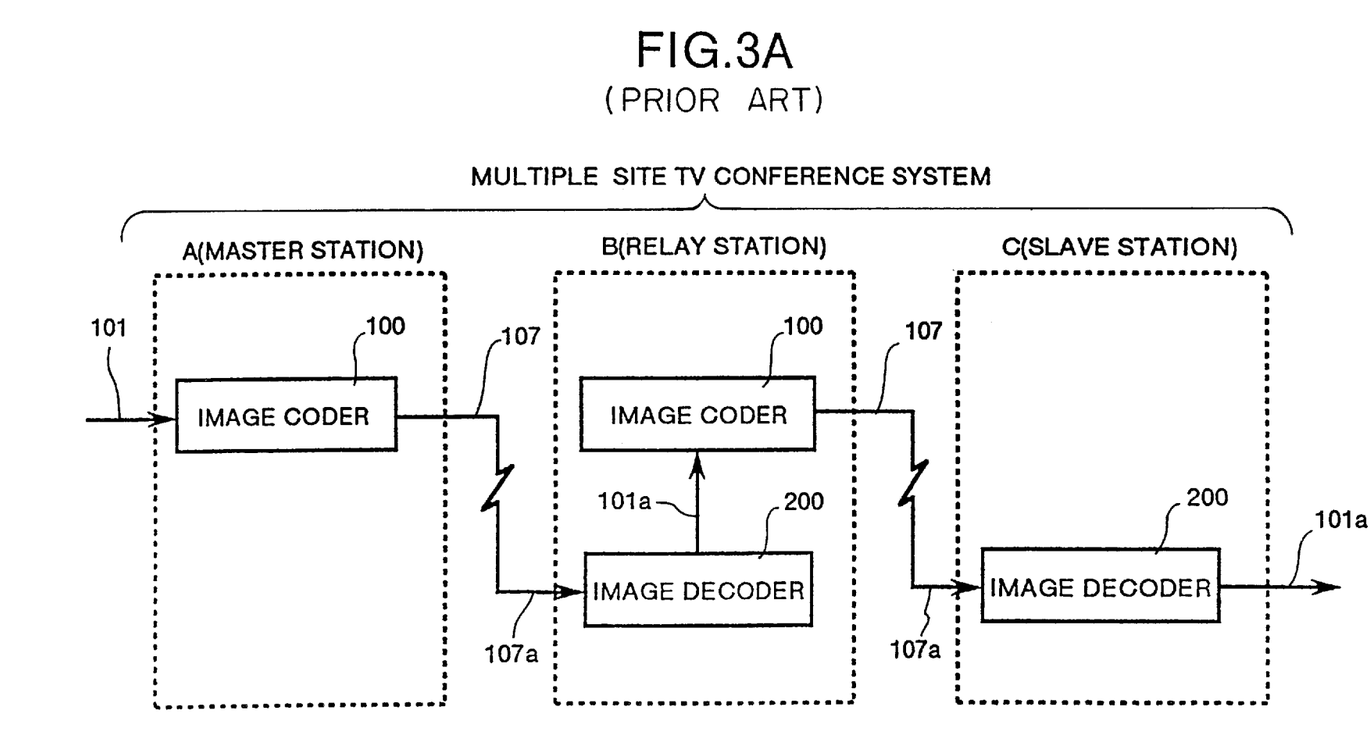
FIGS. 3A and 3B are block diagrams showing a conventional type of image coded data re-encoding apparatus.
Figure 3B:
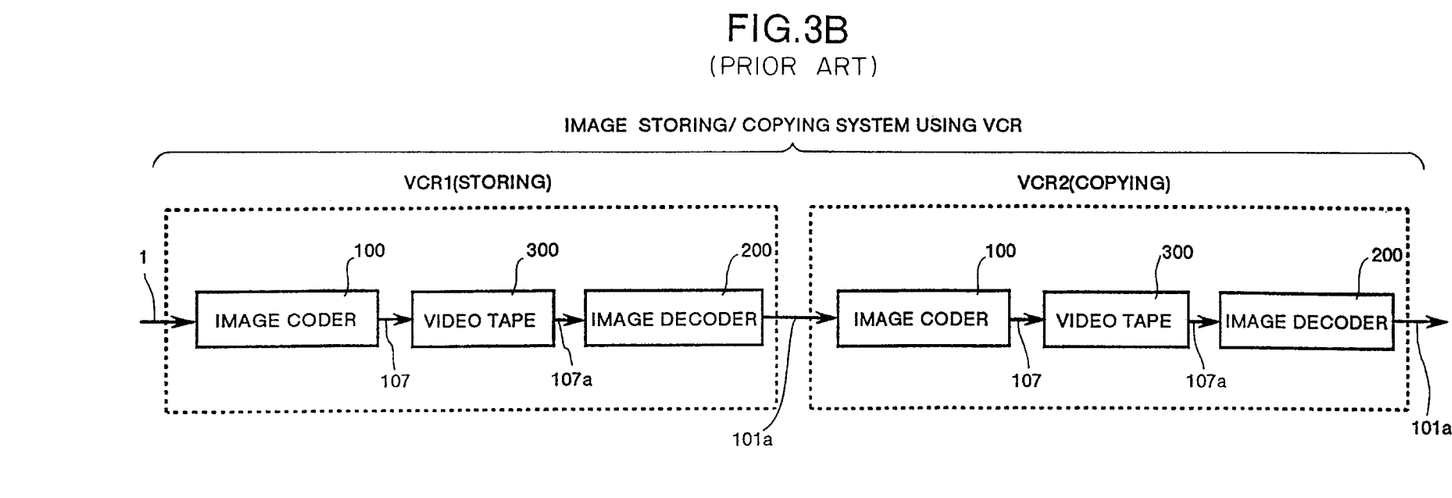

In the conventional type of image coded data re-encoding apparatus as disclosed, for instance, in Japanese Patent Laid-Open Publication No. 179186/1990, as shown in FIG. 3A, an inputted image 101 is coded by an image coder 100 in a master station A, generated image coded data (transmitted data) 107 or 107a is decoded by an image decoder 200 in a relay station B, and a decoded image 101a is again coded by an image coder 100 in the relay station B. Relayed image coded data (transmitted data) 107 or 107a is decoded by an image decoder 200 as a decoded image 101a in a slave station C. In a case where a TV conference is held through the relay station B having a decoding and relaying function, to adjust a volume of generated coded data (or a image data compression ratio) and various types of parameter (such as an image size or a frame rate) when a coding system in the master station A is different from that in the slave station C, after the decoded image 101a is obtained once, the data is coded again for coordination. Also, when a stored image is copied by using a video cassette recorder (VCR), the image coded data (stored data) 107a re-encoded in a video tape 300 is decoded, as shown in FIG. 3B, and then re-encoded for copying.

The conventional type of image coded data re-encoding apparatus as described above is based on a system in which image coded data is once decoded for relaying or copying and then re-encoded.

Figure 4A:
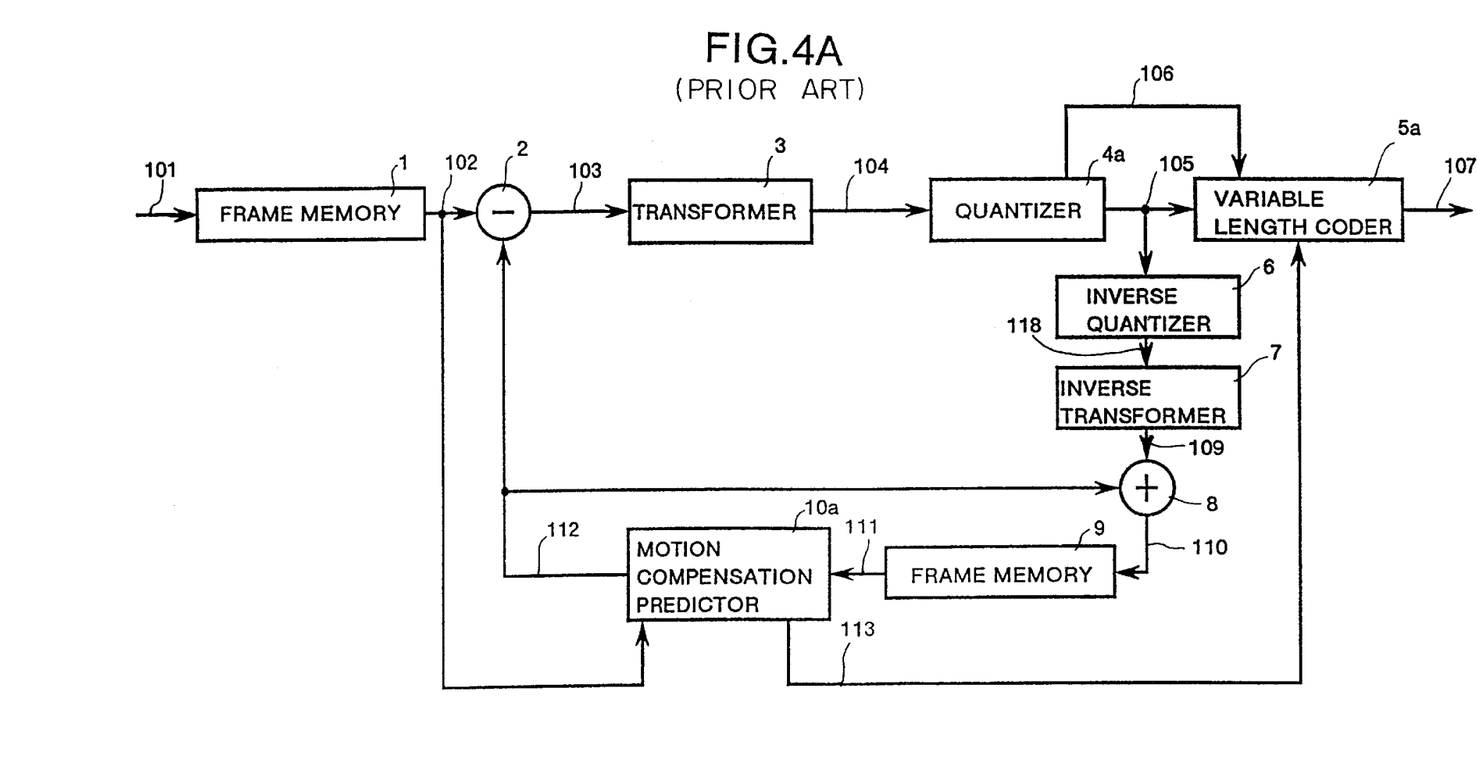
FIGS. 4A and 4B are functional block diagrams of the image coder as well as of the image decoder shown in FIGS. 3A and 3B.

In the image coder 100, as shown in FIG. 4A, to satisfy the requirements, for instance, in the international standardizing system MPEG1 (Moving Picture Experts Group 1) based on the cooperation between ISO (International Standardizing Organization) and IEC (International Electric Standard Conference), at the first subtraction between a current frame image 102 to be coded and stored in a frame memory 1 among the digital input image 101 and an predicted frame image 112 from a motion compensation predictor 10 in a subtracter 2 to generate an predicted error frame image 103.

Then, the predicted error frame image 103 is subjected to computing for DCT (discrete cosine transformation) by the transformer 3, and then scalar quantization processing according to a quantizing step corresponding to a feedback control in which a generated transform coefficient 104 is monitored and a quantity of generated code is controlled to a constant level by a quantizer 4a or a feed forward control through measurement of diffusion of input images or the like, generated quantized index 105 is subjected together with quantized parameters 106 generated by the quantizer 4a or a motion vector 113 generated by the motion compensation predictor 10a to variable length coding processing with Huffman code or the like by a variable length coder 5a, and generated image coded data 107 is transferred through a communication line, or is stored in a storage medium such as a CD-ROM (Compact Disk-Read Only Memory) or video tape.

Figure 5:
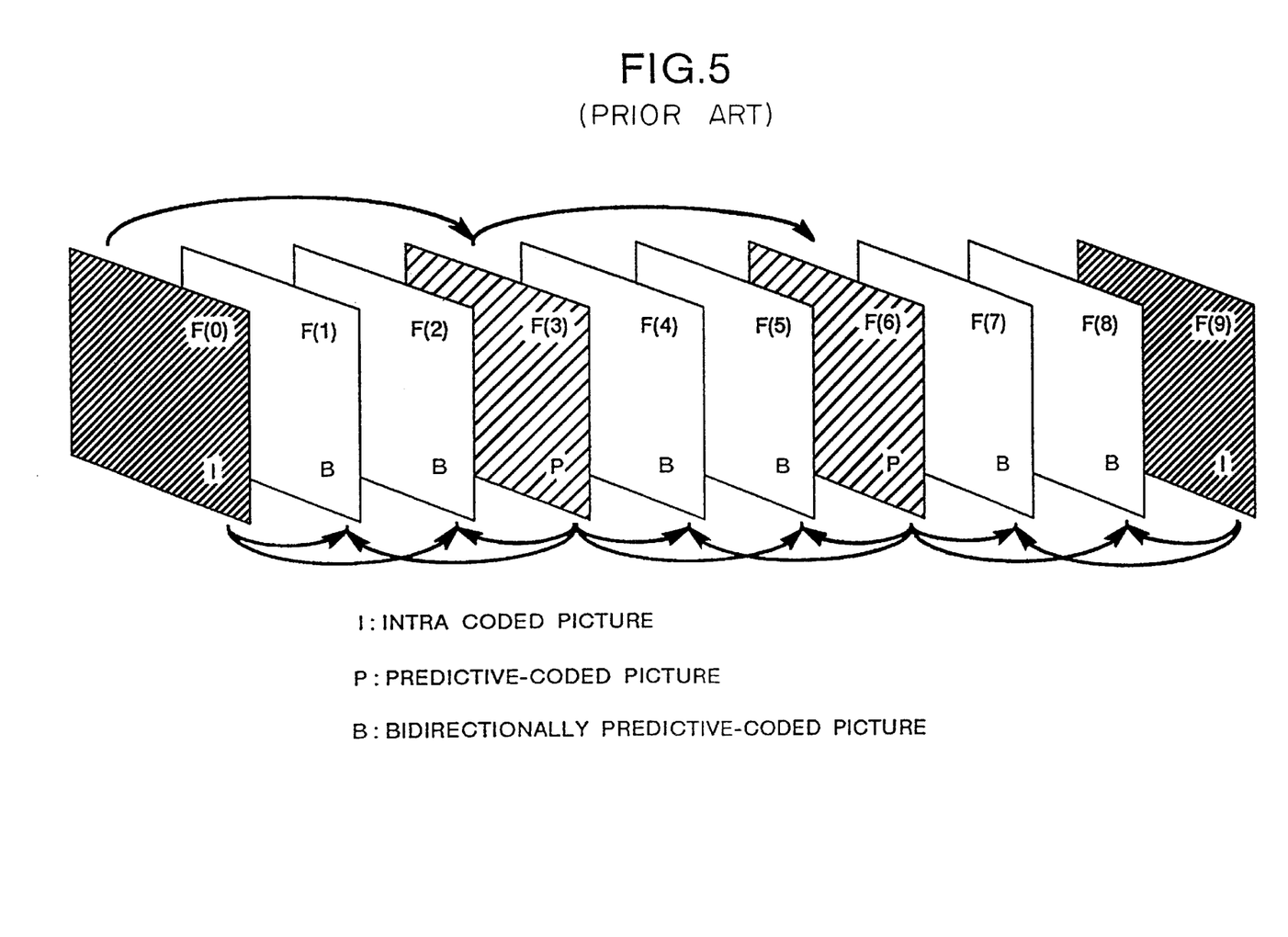
FIG. 5 is a view showing three types of coding mode based on a system in which MPEG1 motion compensation is predicted by the motion compensation predictor shown in FIGS. 4A and 4B.

Furthermore, according to the quantization index 105 from the quantizer 4a, a local predicted error frame image 109 obtained by inverse transforming with an inverse transformer 7 a transform coefficient 108 inverse quantized by a inverse quantizer 6 is added to an predicted frame image from the motion compensation predictor 10a in an adder 8 to generate a locally decoded frame image 110. The locally decoded frame image 110 is coded and stored in a frame memory 9, and the coded preceding frame image 111 is subjected to computing for pattern matching with a current frame image 102 from the frame memory 1 to generate an predicted frame image 112 already subjected to motion compensation and giving a minimum error. In the MPEG1 motion compensation prediction system, as shown in FIG. 5, three types of coding mode (intra-frame prediction/prediction between forward motion compensated frames/prediction between bidirectional motion compensated frames) are available.

For I picture (intra coded picture) F(0) and F(9), estimation for motion compensation is not executed (Namely, the predicted frame image 112 is not generated). As the I picture is used as a reference image for prediction of motion compensation, it is required to improve quality of the decoded image, and in addition as prediction of motion compensation is not executed, a quantity of code becomes substantially large.

For an P picture (predictive-coded picture) F(3) and F(6), prediction of motion compensation is executed by using only images preceding in terms of time (for instance, F(0) for F(3) and F(3) for F(6)). As a P picture is used as a reference image for prediction of motion compensation, it is required to improve quality of the decoded image to some extent.

For a B picture (bidirectionally predictive-coded picture) F(1), F(2), F(4), F(5), F(7) and F(8), prediction of motion compensation is executed by using 2 images before and after the B picture in terms of time. As a B picture is not used as a reference image for estimation of motion compensation, rough quantization is allowable. As prediction of motion compensation is executed bidirectionally, if, for instance, quality of I and P pictures before and after the B picture in a certain sequence in motion is high, a decoded image can be obtained from only the motion vectors, and a quantity of generated code is rather small. When the coding mode shown in FIG. 5 is employed, the coding object current frame memory 1 outputs F(0), F(3), F(1), F(2), F(6), F(4), F(5), F(9), F(7), and F(8) in this order.

Figure 4B:
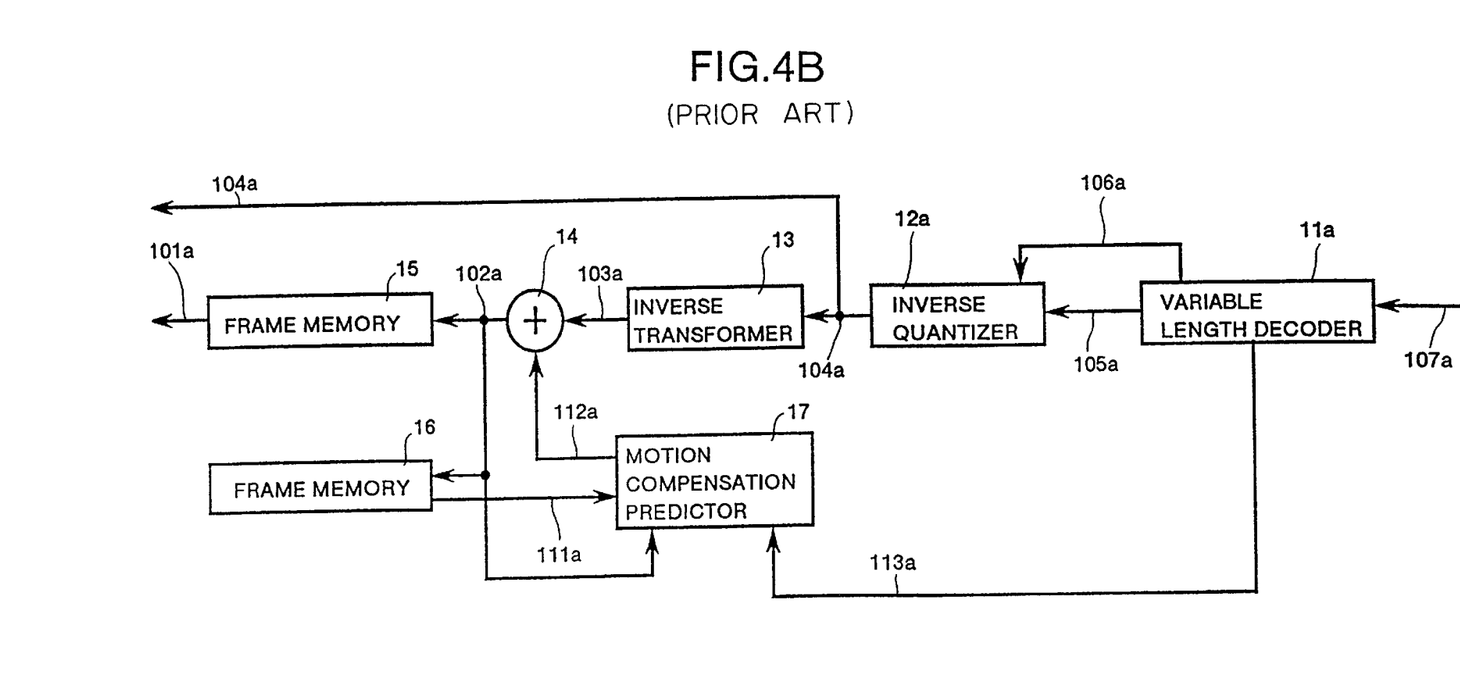

The image decoder 200 execute operations in a flow reverse to that of operations by the image coder 100 shown in FIG. 4A, as shown in FIG. 4B. At first a bit stream of image coded data (transmitted/stored data) 107a from a communication line or a storage medium is subjected to variable length decoding processing by a variable length decoder 11a, decoded quantization index 105a is subjected to a inverse-scalar quantization processing according to a decoded quantization parameter 106a from the variable length decoder 11a in a inverse quantizer 12a, and then a inverse quantized transform coefficient 104a is subjected to inverse-DCT computing in an inverse transformer 13, thus an predicated error frame image 103a being generated.

A current frame image 102a to be decoded, said image 102a obtained by adding an predicated error frame image 103a to a predicated frame image 112a from a motion compensation predictor 17 in an adder 14 is stored in a decoding object current frame memory 15 and is outputted as the decoded image 101a. Furthermore, in response to a decoded preceding frame image 111a stored in a decoded preceding frame memory 16, the predicted frame image 112a is generated according to a decoded motion vector 113a from the variable length decoder 11a in the motion compensation predictor 17.

In the conventional type of image coded data re-encoding apparatus as described above, the system is employed in which image coded data is once decoded for relaying or copying and then re-encoded, quality of a decoded image is deteriorated. Also, delay in processing increases, which requires a larger scale of system to solve the problems as described above.

SUMMARY OF THE INVENTION

It is an object of the present invention to provide an image coded data re-encoding apparatus based on a system in which data decoded for relaying or copying from an image decoder is again coded so that image quality is not so much deteriorated, delay in processing is reduced, a downsizing of a system is enabled, and the coding efficiency is improved (an image coded data re-encoding system using coded data once decoded for some particular purposes).

The image coded re-encoding apparatus according to the present invention is characterized in that the following types of means as described hereinafter are provided for achieving the objects described above and an image coded data re-encoding system using data on decoded data for coding is employed.

An image decoder receives and decodes image coding data inputted thereinto, and outputs decoded images, and also outputs decoded data on coding, and outputs inputted image coding data, without decoding the data, to an image coder as it is.

The image coder uses decoded data for coding to a decoded image inputted from the image decoder, re-encodes and output the data. The image coder uses, for instance, coding mode as decoded data concerning coding, and re-encodes and outputs a decoded image inputted thereinto only in the inter-frame predicated coding mode. During the intra-frame coding mode, the image decoder outputs image coding data, without decoding the data, as it is. Also, the image coder uses the coding mode as decoded data, and controls an applicable coding mode and a quantity of generated code according to the coding mode. For instance, if a decoded image is in the intra-frame coding mode, the image coder executes intra-frame coding, and if the decoded image is in the inter-frame predicted coding mode, the image coder executes inter-frame predicted coding. Also, the image coder starts the re-encoding process preferentially from frame images in the intra-frame coding mode. Also, the image coder starts the down sampling process preferentially from frame images in the inter-frame predicted coding mode. Furthermore, the image coder starts reducing a quantity of generated code preferentially from frame images in the inter-frame predicted coding mode. Also, the image coder provides controls over quantization, executes motion compensation prediction processing, variable length coding processing, and quantization by using quantized parameters, motion vectors, quantized index, or inverse transformed transform coefficients respectively as decoded data for coding. Also, the image coder sets upper limit values from decoded quantization parameters for controlling quantization. Also, the image coder executes correction using decoded motion vectors as initial values or according to a ratio of an image size to be changed for motion compensation predication. In addition, the image coder compulsively zeros transform coefficients inverse quantized by the image decoder or decoded indexes for quantization. However, when a number of non-zero transform coefficients for quantization inverse quantized or decoded indexes for quantization exceeds a number of non-zero transform coefficients or decoded indexes above specified the current coding mode, the image coder compulsively zeros the transform coefficients or indexes, and also compulsively zeros transform coefficients before quantization and quantization indexes before variable length coding each generated by the image coder under the same conditions as those described above. Also, the image coder limits a number of transform coefficients inverse quantized by the image decoder or decoded quantization indexes according to a ratio of an image size to be changed.

The image coded data re-encoding apparatus according to the present invention decodes image coded data to be coded again with an image decoder to which image data is inputted from a communication line or a storage media, outputs a decoded image, and also outputs data (such as motion vectors, parameters for quantization, and transform coefficient) for coded data decoded as described above. Then the image coded data re-encoding apparatus subjects the decoded image to re-encoding using data for the decoded coded image data with an image coder, into which image data is inputted from the image decoder, and outputs the re-encoded data. In brief, the image coded data re-encoding apparatus executes the following operations.

(1) The image coded data re-encoding apparatus controls the applicable coding mode as well as a quantity of generated code using a decoded coding mode and according to the coding mode. For instance, the apparatus executes intra-frame coding according to the intra-frame coding mode, or executes inter-frame prediction coding according to the inter-frame prediction coding mode or, the re-encoding processing is started preferentially from a frame image in the intra-frame coding mode. Also, the apparatus executes frame images in the inter-frame prediction coding mode preferentially and executes inter-frame down sampling out processing or reduces a quantity of generated code.

(2) The image coded data re-encoding apparatus controls quantization using decoded parameters for quantization. Also, the apparatus sets a upper limit value from the parameters for quantization and controls quantization.

(3) The image coded data re-encoding apparatus executes motion compensation prediction processing using re-encoded motion vectors. Also, the apparatus executes correction according to a ratio of image size to be changed using the motion vectors as an initial value.

(4) The image coded data re-encoding apparatus executes quantization or variable length coding processing using a transform coefficient inverse quantized or decoded index for quantization. When a number of non-zero transform coefficients inverse quantized or indexes for quantization exceeds a number of non-zero parameters prespecified for the current coding mode, an image decoder compulsively changes the non-zero parameters to zero. Also, the apparatus limits a number of inverse quantized transform coefficients or decoded indexes for quantization according to a height vs width ratio of an image size to be changed. Also the apparatus compulsively zeros generated transform coefficients or indexes for quantization with the image coder under the same conditions as those described above or limits a number thereof.

(5) The apparatus re-encodes and outputs a decoded image inputted only in the inter-frame prediction coding mode using the decoded coding mode. In the intra-frame coding mode, the apparatus outputs image coded data which is inputted from an image decoder and is to be outputted without being decoded as it is.

Other objects and features of this invention will become understood from the following description with reference to the accompanying drawings.

DESCRIPTION OF THE PREFERRED EMBODIMENTS

Figure 1A:
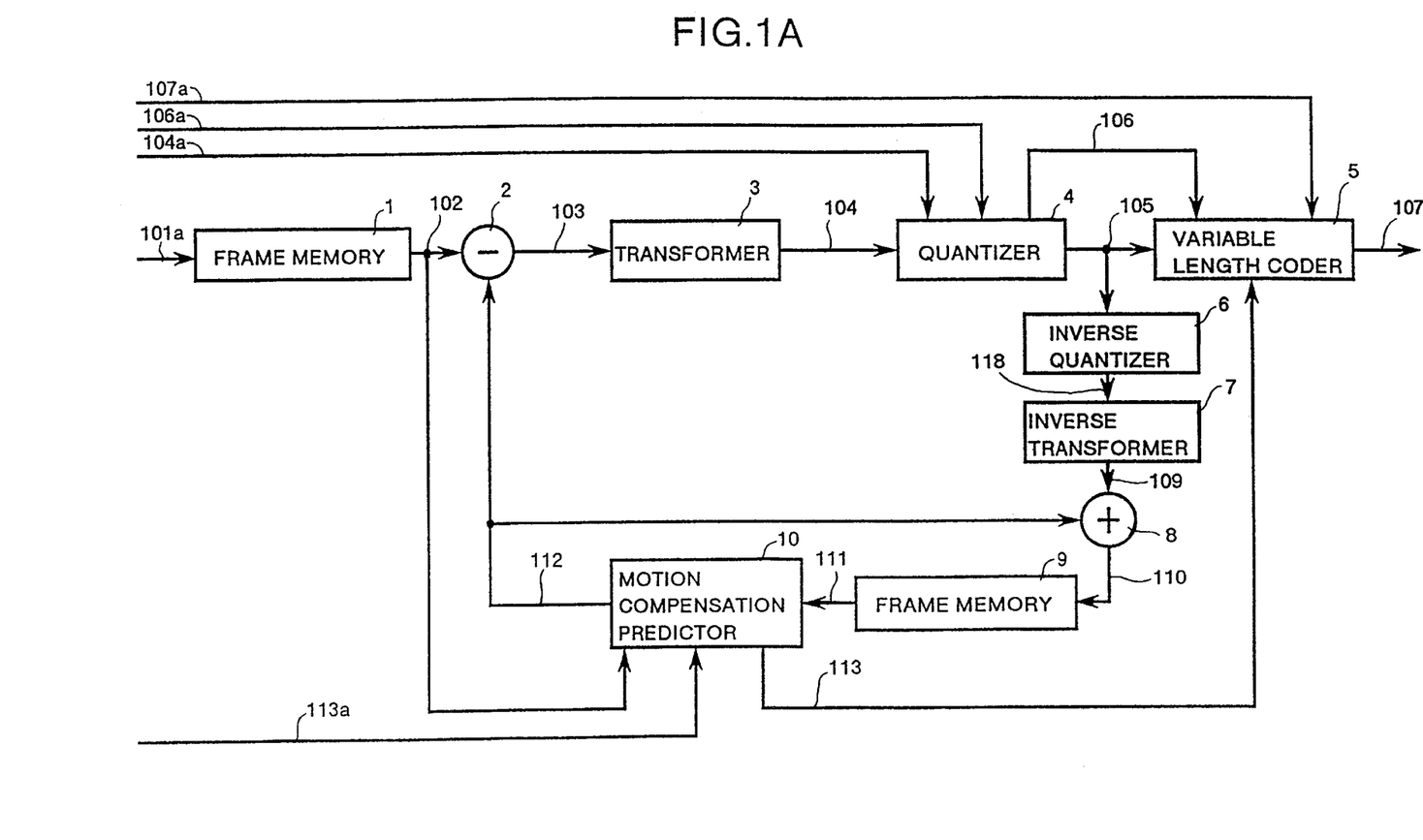
FIGS. 1A and 1B are functional block diagrams showing an image coded data re-encoding apparatus according to one embodiment of the present invention.

The image coded data re-encoding apparatus according to one embodiment of the present invention is an image coder (Refer to FIG. 1A) as shown in FIG. 1, and includes a frame memory 1, a subtracter 2, a transformer 3, a inverse quantizer 6, an inverse transformer 7, an adder 8, and a frame memory 9 each corresponding to the one shown in FIG. 4A.

The quantizer 4 corresponds to the conventional one shown in FIG. 4A, and subjects a inverse quantized transform coefficient 104a to scalar quantization when receiving a inverse quantized transform coefficient 104a from a inverse quantizer 12 or decoded parameters 106a for quantization from a variable length decoder 11 in an image decoder, executes a feed back or feed forward control, subjects decoded parameters for quantization 106a to scalar quantization according to an applicable quantizing step, and outputs indexes 105 for quantization.

The variable length coder 5 corresponds to the conventional one shown in FIG. 4A, and, when image coded data (transmitted/stored data) 107a is image coded data for an I picture and the image coded data (transmitted/stored data) 107a not to be decoded is received from the variable length decoder 11, generates the image coded data 107a as image coded data (transmitted/stored data) 107 as it is.

The motion compensation predictor 10 corresponds to the conventional one (10a) shown in FIG. 4A, and, when receiving decoded motion vectors 113a from the variable length decoder 11 in an image coder, makes a determination as to which of I or P or B picture the coding mode for the image coded data (transmitted/stored data) 107a is, and does not predict motion compensation for an I picture if the coding mode is for an I picture, or predicts forward motion compensation for a P picture if the coding mode is for a P picture, thus switching a coding mode for prediction of motion compensation in synchronism to an image decoder. Furthermore, the motion compensation predictor 10 receives the decoded motion vectors 113a and outputs the motion vector 113.

Figure 1B:
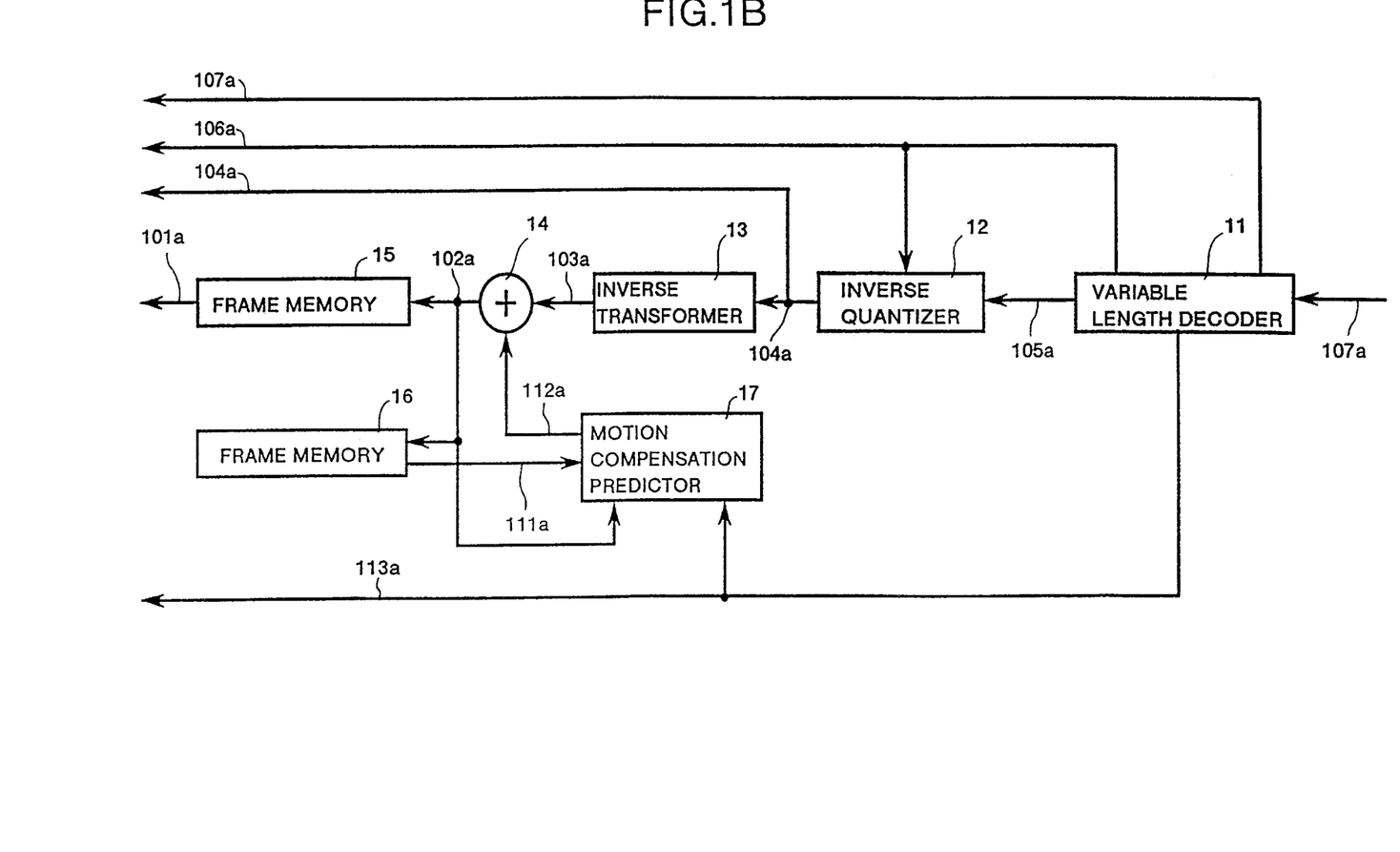

Also, the image decoder (Refer to FIG. 1B) comprises an inverse transformer 13, an adder 14, a frame memory 15, frame memory 16, and a motion compensation predictor 17, like in the conventional type of image decoder as shown in FIG. 4B. The variable length decoder 11 corresponds to the conventional one shown in FIG. 4B, and when a bit stream of the image coded data (transmitted/stored data) 107a from a communication line or a storage medium is image coded data for an I picture, outputs the bit stream without decoding as it is to an image coder.

Furthermore, the variable length decoder 11 outputs the decoded parameters 106a for quantization to both the inverse quantizer and an image coder and decoded motion vectors to both the motion compensation predictor 17 and the image coder. The inverse quantizer is corresponds to FIG. 4B showing the example of conventional technology described above, and outputs the inverse quantized transform coefficients 104a to the inverse convertor 13 as well as to the image coder.

The image coded data re-encoding apparatus according to the above embodiment is based on a system in which data concerning coding such as transform coefficients 104a inverse quantized from a image decoder, decoded parameters 106a for quantization, and decoded motion vectors 113a is used, and image coded data is re-encoded for replaying, or copying (an image coded data re-encoding system making use of decoded data for decoding).

Figure 2:
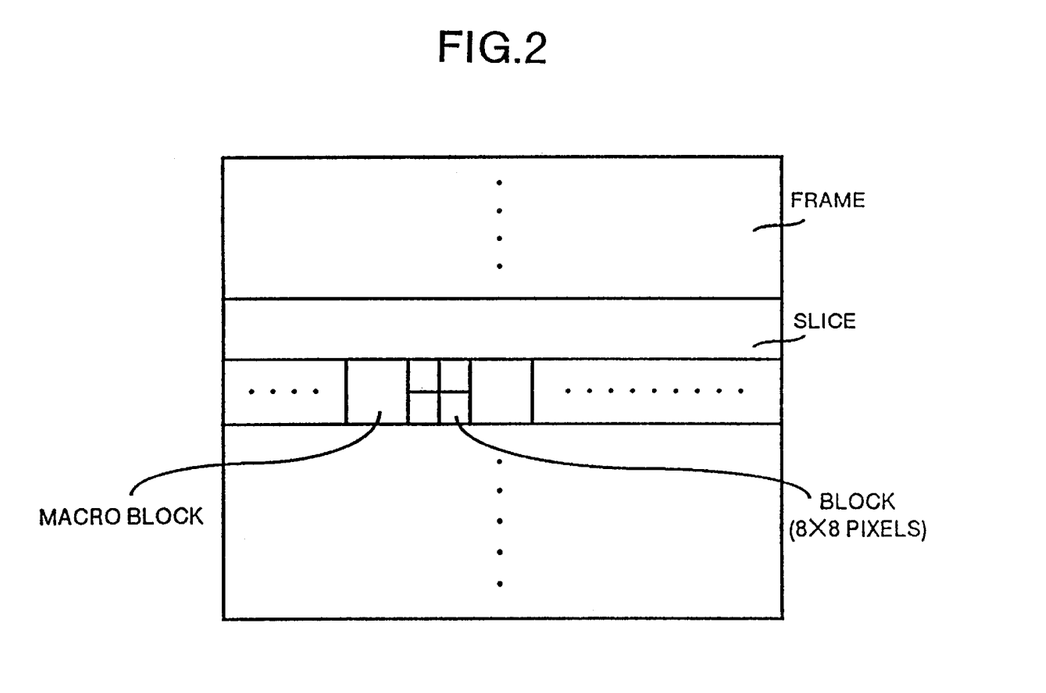
FIG. 2 is an explanatory view for explaining an image hierarchy unit for switching a coding mode with the motion compensation predictor shown in FIGS. 1A and 1B.

It should be noted that description of the embodiment above assumes that coding mode is switched by a frame by the motion compensation predictor 10, but coding mode may be switched by a hierarchical unit consisting of either one of a slice comprising a plurality of macro blocks as shown in FIG. 2, a macro block comprising 6 blocks, and a block comprising 8×8 pixels. Even if the image coded data (transmitted/stored data) 107a is a P picture, a system can be employed in which a certain slice or a certain macro block, or a certain block is re-encoded in the intra-frame coding mode. For a slice, a macro block, or a block each having been in the intra-frame coding mode, control can be provided by a hierarchical unit smaller than a frame by synchronizing the coding mode and re-encoding them in the intra-frame coding mode.

In the embodiment described above, the motion compensation predictor 10 may preferentially re-encode frame images (I pictures) in the intra-frame coding mode when re-encoding image coded data if it is necessary to make the frame rate larger (for instance, in a case when image coded data having a frame rate of 24 frames/sec such as that in a moving picture is re-encoded at a frame rate of 30 frames/sec usually used in Japan). With this scheme, the efficiency can be improved.

On the contrary, when it is necessary to make a frame rate smaller, I and P pictures each having high image quality may be re-encoded by sequentially down sampling out interbidirectional motion compensation frame prediction coded frame images (B pictures) not used as reference images for estimating motion compensation. With this scheme, the image quality can be improved. When it is necessary to reduce a quantity of generated code (For instance, when re-encoding image coded data having a bit rate of 10 mega bits/sec at a code rate of 5 mega bits/sec), a quantity of code for B pictures may preferentially be reduced to re-encode I and P pictures each having a high image quality at first. With this scheme, the image quality can be improved.

Also after synchronism of the coding mode is established, a frequency of I pictures may be made smaller (for instance, image coded data having a frame rate of 1 degree/9 frames at a rate of 1 degree/18 frames). With this scheme, the effectivity can be improved.

Although description of the above embodiments assumes that the motion compensation predictor 10 outputs the decoded motion vectors 113a as they are as motion vectors 113, the motion is searched on specified range centering on the decoded motion vector 113a and the motion vectors 113 is outputted. For searching optimal motion vectors, generally a long time for repeated computing is required, but with this scheme a quantity of data to be computed can be reduced without deteriorating the efficiency in coding.

Also, when it is necessary to transfer image coded data with a half image size, a value of the decoded motion vector 113a is arranged to half size, and the motion vectors 113 is outputted. With this scheme, a step of vector search can be eliminated.

Although description of the above embodiment assumes that the quantizer 4 executes quantization according to quantizing steps suited to decoded parameters 106a for quantization, a upper limit value for quantization parameters may be set according to the decoded parameters for quantization 106a. Even if, when re-encoding image coded data, fine quantization processing is executed after rough quantization range is decoded, it is not effective for improving the image quality, so that with this scheme generation of unnecessary data due to setting of an upper limit value can be prevented.

Although description of the above embodiment assumes that the quantizer 4 executes quantization to transform coefficients 104a inverse quantized, if a number of non-zero transform coefficients 104a outputted from the inverse quantizer 12 per block exceeds a value prespecified for the current coding mode, the non-zero coefficients may compulsively be changed to zero. With this scheme, a quantity of generated code can be controlled.

Also, a number of non-zero indexes for quantization 105 outputted from the quantizer 4 can be controlled as described above. Also a quantity of generated code can be controlled as described above.

When it is necessary to re-encode image coded data by reducing the image size, a number of transform coefficients 104a inverse quantized may be controlled. For instance, both vertical and horizontal lengths of an image can be reduced to ½ by providing controls by means of using in the quantizer 4, 4×4 transform coefficients 104a in a low frequency zone of transform coefficients 104a for 8×8 pixels outputted from the inverse quantizer 12.

Also, decoded indexes for quantization 105a may be inputted to the variable length coder 5 as well as to the inverse quantizer 5 in place of inputting the transform coefficients 104a inverse quantized to the quantizer 4. With this scheme, the same effect as that described above can be achieved.

Although description of the embodiment above assumes that the variable length coder 5 outputs transmitted/stored data 107a, which is image coded data for an I picture, as it is to an image coder without decoding the data, the configuration is allowable in which only I pictures at a given interval are not decoded. Similarly a system is allowable in which only P pictures and B pictures at a given space are not decoded. With this scheme, a quantity of generated code can be adjusted.

Also, in the embodiment above, if it is necessary to execute specific generation ( in case of high speed search or in case of I/O frame rate), I and P pictures may preferentially be re-encoded. With this scheme, an image having a high image quality can be regenerated.

Although description of the above embodiments assumes that the coding system is MPEG1 (coding system for a storage medium), it is needless to say that other coding systems such as H. 261 (coding system for TV conference and telephone) are applicable. Even when a coding system in an image coder is different from that in an image decoder, if a common coding mode such as, for instance, an intra-frame coding mode or an inter-frame prediction coding mode is available, the image coded data can be re-encoded by controlling the coding mode.

Also, it is needless to say that the above embodiment is not limited to the configuration like the conventional ones as shown in FIG. 3A and FIG. 3B and an image storing/copying system comprising a television conference combining 4 or more installation sites or 3 or more video cassette recorders can be built up.

Also, it is needless to that any image storing/copying system can be used in the above embodiment on the condition that coded data is decoded and outputted by making use of the VCR1 side like a decoder for a storage media (disk or the like) or a decoder for communication and broadcasting receiving coded data without using two units of VCR.

In the image coding data re-encoding apparatus according to the present invention as described above, a system for re-encoding image coding data by using decoded data for coding is employed, so that, as compared to the conventional type of re-encoding processing is executed after decoding, deterioration of image quality is small, delay in processing is shortened, a scale of the apparatus can be minimized, and efficiency in coding can be improved.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image coded data re-encoding apparatus comprising:

an image decoder for receiving and decoding a sequence of images including intra-coded frames inputted thereinto to generate decoded data, and for outputting output data including said sequence of images, an inverse quantized transform coefficient, a decoded parameter for quantization, and said intra-coded frames, said intra-coded frames being output without being decoded by the image decoder, said image decoder further outputting said decoded data; and an image coder for creating and outputting a second sequence of images based upon said decoded data and said output data received from said image decoder.

2. An image coded data re-encoding apparatus according to claim 1, wherein in the image coder, control over quantization is executed using a decoded parameter for quantization included within the output data output from said image decoder .

3. An image coded data re-encoding apparatus according to claim 1, wherein in the image coder, motion compensation processing is executed by using decoded motion vector information included within the output data output from said image decoder.

4. An image coded data re-encoding apparatus according to claim 3, wherein a decoded motion vector is used as an initial value.

5. An image coded data re-encoding apparatus according to claim 3, wherein when changing an image size in said image coder, a decoded motion vector is corrected according to a fraction of said image size to be changed.

6. An image coded data re-encoding apparatus according to claim 1, wherein in the image coder, decoded data for coding mode is used as decoded data for coding, and an applicable coding mode and a quantity of generated code are controlled according to said coding mode.

7. An image coded data re-encoding apparatus according to claim 6, wherein in the image coder, control over quantization is executed using a decoded parameter for quantization included within the output data output from said image decoder.

8. An image coded data re-encoding apparatus according to claim 6, wherein in the image coder, motion compensation processing is executed by using decoded motion vector information included within the output data output from said image decoder.

9. An image coded data re-encoding apparatus according to claim 8, wherein a decoded motion vector is used as an initial value.

10. An image coded data re-encoding apparatus according to claim 8, wherein when changing an image size in the image coder, a decoded motion vector is corrected according to a fraction of said image size to be changed.

11. An image coded data re-encoding apparatus according to claim 6, wherein intra-frame coding is executed in the intra-frame coding mode and inter-frame predicted coding is executed in the inter-frame predicted coding mode.

12. An image coded data re-encoding apparatus according to claim 11, wherein when in the image coder, control over quantization is executed using a decoded parameter for quantization included within the output data output from said image decoder.

13. An image coded data re-encoding apparatus according to claim 11, wherein in the image coder, motion compensation processing is executed by using decoded motion vector information included within the output data output from said image decoder.

14. An image coded data re-encoding apparatus according to claim 13, wherein a decoded motion vector is used as an initial value.

15. An image coded data re-encoding apparatus according to claim 13, wherein when changing an image size in the image coder, a decoded motion vector is corrected according to a fraction of said image size to be changed.

16. An image coded data re-encoding apparatus according to claim 6, wherein re-encoding processing is started preferentially from frame images in the intra-frame coding mode.

17. An image coded data re-encoding apparatus according to claim 16, wherein in the image coder, control over quantization is executed using a decoded parameter for quantization included within the output data output from said image decoder.

18. An image coded data re-encoding apparatus according to claim 16, wherein in the image coder, motion compensation processing is executed by, using decoded motion vector information included within the output data output from said image decoder.

19. An image coded data re-encoding apparatus according to claim 18, wherein a decoded motion vector is used as an initial value.

20. An image coded data re-encoding apparatus according to claim 18, wherein when changing an image size in the image coder, a decoded motion vector is corrected according to a fraction of said image size to be changed.

21. An image coded data re-encoding apparatus according to claim 6, wherein the inter-frame down sampling processing is started preferentially from frame images in the inter-frame predicted coding mode.

22. An image coded data re-encoding apparatus according to claim 21, wherein in the image coder, control over quantization is executed using a decoded parameter for quantization included within the output data output from said image decoder.

23. An image coded data re-encoding apparatus according to claim 21, wherein in the image coder, motion compensation processing is executed by using decoded motion vector information included within the output data output from said image decoder.

24. An image coded data re-encoding apparatus according to claim 23, wherein a decoded motion vector is used as an initial value.

25. An image coded data re-encoding apparatus according to claim 23, wherein when changing an image size in the image coder, a decoded motion vector is corrected according to a fraction of said image size to be changed.

26. An image coded data re-encoding apparatus according to claim 6, wherein reduction of a quantity of generated code is started from frame images in the inter-frame predicted coding mode.

27. An image coded data re-encoding apparatus according to clam 26, wherein in the image coder, control over quantization is executed using a decoded parameter for quantization included within the output data output from said image decoder.

28. An image coded data re-encoding apparatus according to claim 26, wherein in the image coder, motion compensation processing is executed by using decoded motion vector information included within the output data output from said image decoder.

29. An image coded data re-encoding apparatus according to claim 28, wherein a decoded motion vector is used as an initial value.

30. An image coded data re-encoding apparatus according to claim 28, wherein when changing an image size in the image coder, a decoded motion vector is corrected according to a fraction of said image size to be changed.

31. An image coded data re-encoding apparatus according to claim 26, wherein control over quantization is executed using decoded quantization parameters as decoded data for coding and setting upper limit values from said quantization parameters.

32. An image coded data re-encoding apparatus according to claim 31, wherein in the image coder, motion compensation processing is executed by using decoded motion vector information included within the output data output from said image decoder.

33. An image coded data re-encoding apparatus according to claim 32, wherein a decoded motion vector is used as an initial value.

34. An image coded data re-encoding apparatus according to claim 32, wherein when changing an image size in the image coder, a decoded motion vector is corrected according to a fraction of said image size to be changed.

35. An image coded data re-encoding apparatus according to claim 1 wherein in the image coder, quantization processing is executed using transform coefficients, included within the output data output from said image decoder, which are inverse quantized by said image decoder.

36. An image coded data re-encoding apparatus according to claim 35, wherein a number of non-zero transform coefficients inverse quantized by the image decoder is counted, and if the count exceeds a number of non-zero transform coefficients preset for the current coding mode, a number of inverse quantized transform coefficients is compulsively changed to zero.

37. An image coded data re-encoding apparatus according to claim 35, wherein a number of non-zero transform coefficients generated by the image coder before quantization is counted, and if the count exceeds a number of non-zero transform coefficients preset for the current counting mode, a number of the inverse quantized transform coefficients is compulsively changed to zero.

38. An image coded data re-encoding apparatus according to claim 35, wherein, when changing an image size in re-encoding, a number of transform coefficients inverse quantized by an image decoder is limited to said image size to be changed.

39. An image coded data re-encoding apparatus according to claim 1, wherein when re-encoding with the image coder, variable length coding processing is executed using decoded quantization indexes included within the output data output from said image decoder.

40. An image coded data re-encoding apparatus according to claim 39, wherein a number of non-zero indexes for quantization decoded by the image decoder is counted, and if the count exceeds a number of non-zero indexes preset to the current coding mode, a number of the non-zero indexes is compulsively changed to zero.

41. An image coded data re-encoding apparatus according to claim 39, wherein a number of non-zero indexes for quantization generated by the image coder before variable length coding is counted, and if the count exceeds a number of non-zero indexes for quantization preset for the current coding mode, a number of the non-zero indexes is compulsively changed to zero.

42. An image coded data re-encoding apparatus according to claim 39, wherein when changing an image size in the image coder, a number of indexes for quantization decoded by the image decoder is limited according to a ratio of said image size to be changed.

43. An image coded data re-encoding apparatus according to claim 1, wherein in the image coder, decoded images inputted thereto are re-encoded and outputted only in the inter-frame prediction coding mode, and the decoded images are outputted without being decoded as they are in the intra-frame coding mode by using decoded data coding in both of the modes.

* * * * *